United States Patent [19]

Nucci et al.

[11] Patent Number: 6,054,218

[45] Date of Patent: Apr. 25, 2000

[54] PAPER LIKE SHEET OF PLASTIC MATERIAL

[75] Inventors: Connie J. Nucci, Markham; Jean-François Dalpé, Sainte-Dorothée, both of Canada

[73] Assignee: Glopak Inc., Saint-Leonard, Canada

[21] Appl. No.: 09/074,855

[22] Filed: May 8, 1998

[51] Int. Cl.[7] .......................................................... B32B 5/16

[52] U.S. Cl. .......................... 428/402; 428/141; 428/143; 428/144; 428/195; 428/322.7; 428/407

[58] Field of Search ..................................... 428/402, 141, 428/143, 144, 407, 322.7, 195

[56] References Cited

U.S. PATENT DOCUMENTS 5,667,872  9/1997  Ohno et al. .............................. 428/141

*Primary Examiner*—William Krynski
*Assistant Examiner*—Hong J. Xu
*Attorney, Agent, or Firm*—Carter & Schnedler, P.A.

[57] ABSTRACT

A multilayer sheet made of an outer layer comprising polyethylene, a finely granulated material and a pigment, a middle layer comprising polyethylene, which may contain a finely granulated material and a pigment, and an inner layer which contains a polyethylene and which may also contain a filler and a pigment. The multilayer sheet feels like and has at least some of the properties of paper.

16 Claims, No Drawings

PAPER LIKE SHEET OF PLASTIC MATERIAL

BACKGROUND OF INVENTION a) Field of the Invention

The present invention relates to a sheet of plastic material which feels like and has at least some of the properties of paper, such as oxygen transmission rate, water vapor transmission rate and coefficient of friction, a process of producing same, as well as a composition for use in producing said sheet material. More particularly, the invention is concerned with a product which somewhat behaves and feels like paper, advantageously replaces food wrapping paper sheet material, can be used to replace stitched multi-wall paper bags, and finally is less expensive than paper.

b) Description of Prior Art

It is well known that commercial sheet material is a product which has found a very large variety of uses. Presently, the most popular products of this kind are either made of paper or plastic, although some uses have been found for sheets made of metal, such as aluminum. Of course, paper sheets and plastic sheets have different properties, plastic sheets being normally more resistant and more slippery than paper, while paper is normally much less water and air impervious. For purposes of handling and printing thereon, paper sheets are normally much more attractive than plastic sheets.

It will therefore be realized that there is a need for a sheet material that combines some of the properties of both paper sheets and plastic sheets.

A product of this nature has found its way on the market under the trademark Papermatch®, and which is manufactured by A. Schulman Inc. The manufacturer claims that this plastic resin can be used for manufacturing packaging applications, and for labels, envelopes, folders and a variety of other uses. However, except for the fact that it may contain some granular mineral compounded with a resin, to applicant's knowledge, there is no disclosure of a process of producing this material nor of its exact composition. There is therefore a need for a sheet material that feels like and has at least some of the specific properties of paper as well as for a process for producing the same.

SUMMARY OF INVENTION

It is therefore an object of the present invention to provide a sheet of plastic material which feels like and has at least some of the properties of paper. The sheet of plastic material according to the invention comprises a multilayer sheet having an outer layer, a middle layer, and an inner layer. The outer layer comprises between about 15 to 35 weight percent, the middle layer comprises between about 30 and 70 weight percent, and the inner layer comprises between about 15 to 35 weight percent, all with respect to the entire weight of the multilayer sheet. In addition, the outer layer comprises between about 40 to 90 weight percent polyethylene, between about 5 and 50 weight percent of a finely granulated material adapted to give a feel of paper to the multilayer sheet, and between about 5 and 10 weight percent of a pigment. The middle layer comprises between about 60 and 95 weight percent polyethylene, between about 0 and 20 weight percent of the finely granulated material, and between about 5 and 20 weight percent of pigment. Finally, the inner layer comprises between about 70 and 90 weight percent polyethylene, between about 0 and 10 weight percent of filler, and between about 0 and 20 weight percent of pigment.

Depending on the required properties of the multilayer sheet according to the invention, tie different layers may comprise linear low density polyethylene, high density polyethylene, or a mixture thereof. On the other hand, the choice of the finely granulated material is left to one skilled in the art, the preferred product for its convenience being calcium carbonate. A product which is of interest is a particulate calcium carbonate dispersed in a high density polyethylene base. Finally, although the choice of pigment is left entirely to one skilled in the art, the preferred material is titanium dioxide in powder form, although it may also include a beige pigment.

Some layers of the multilayer sheet according to the invention may include a filler as mentioned above. A preferred filler combination includes an anti-blocking agent which is chosen depending on the conditions prevailing in the extruder, silica, talc, diatomaceous earth, and any mixtures thereof.

The outer layer preferably comprises a linear low polyethylene, the middle layer preferably comprises a high density polyethylene, and the inner layer preferably comprises a linear low density polyethylene.

For example, the outer layer may comprise between about 40 and 60 weight percent linear low density polyethylene, between about 30 and 50 weight percent particulate calcium carbonate dispersed in a high density polyethylene base, and between about 4 and 8 weight percent of a pigment comprising titanium dioxide.

On the other hand, the middle layer may comprise high density polyethylene, preferably in an amount between about 75 and 85 weight percent, between about 10 and 20 weight percent of a particulate calcium carbonate dispersed in a high density polyethylene base, and titanium dioxide powder, preferably in an amount between 8 and 12 weight percent. Finally, the inner layer may comprise linear low density polyethylene, for example between about 90 and 98 weight percent, and a filler comprising an anti-blocking agent, talc, silica, and diatomaceous earth, preferably in an amount between about 2 and 10 weight percent.

According to an alternate embodiment, the outer layer is made of high density polyethylene, preferably between about 80 and 90 weight percent, particulate calcium carbonate dispersed in a high density polyethylene, preferably between about 5 and 10 weight percent, and titanium dioxide powder, preferably between about 5 and 10 weight percent.

The middle layer, on the other hand, may comprise between about 80 and 90 weight percent linear low density polyethylene, and between about 10 and 20 weight percent titanium dioxide pigment.

Finally, the inner layer, in his case may comprise between about 60 and 80 weight percent high density polyethylene, between about 10 and 20 weight percent linear low density polyethylene, and between about 10 and 20 weight percent titanium dioxide pigment.

A preferred sheet material according to the invention has the following physical properties: an oxygen transmission rate between about 30 and 50 cc/100 in$^2$/24 hours, a water vapor transmission rate between about 0.01 and 0.025 and a coefficient of friction between about 0.4 and 0.5.

The invention also relates to a process of preparing a sheet multilayer sheet of plastic material which feels like and has at least some of the properties of paper, which comprises providing a first composition comprising between about 40 and 90 weight percent polyethylene, between about 5 and 50 weight percent of a finely granulated material adapted to give a feel of paper to the multilayer sheet, and between about 5 and 10 weight percent of a pigment, providing a second composition comprising between about 60 and 95 weight percent polyethylene between about 0 to 20 weight percent of the finely granulated material and between about 5 and 20 weight percent of the pigment, and providing a third composition comprising between about 80 and 100 weight percent polyethylene, between about 0 and 10 weight percent of a filer, and between about 0 and 20 weight percent of the pigment, separately coextruding the first, second and third compositions and feeding the coextruded compositions to a die, and laminating same to constitute said multilayer sheet of plastic material.

EXAMPLES

The invention will now be illustrated by means of the following non limiting examples.

Example 1

A laminating device consisting of an automatic raw supply for film outer later, an automatic raw supply for film middle layer, and an automatic raw supply for film inner layer, three corresponding extruders, and a multilayer sheet producing die were provided. The automatic raw supply for film outer layer contains 60 weight percent linear low density polyethylene, and 40 weight percent Papennatch® (which is a highly concentrated additive of particulate calcium carbonate and titanium dioxide in a high density polyethylene base, sold by A Schulman Inc. of Akron, Ohio). The automatic supply is adjusted to feed 25 weight percent of the total weight of multilayer sheet to the corresponding extruder. The automatic raw supply for film middle layer contains 75 weight percent high density polyethylene, 10 weight percent titanium dioxide and 15 weight percent calcium carbonate. It is adjusted to feed 50 weight percent of the total weight of the multilayer sheet to the corresponding extruder. Finally, the automatic raw supply for film inner layer contains 96 weight percent low linear polyethylene, and 4 weight percent of a mixture comprising an anti-blocking agent, talc, silica and diatomaceous earth. The three extruders feed to the die which produces a multilayer sheet in a manner known to those skilled in the art. The multilayer sheet which is obtained feels and behaves like paper but is much more resistant than a normal sheet of paper.

Example 2

The procedure as in example 1 was repeated except that the three automatic supplies respectively contain the following ingredients. For film outer layer: 85 weight percent high density polyethylene, 10 weight percent Papermatch® and 5 weight percent titanium dioxide pigment. For film middle layer: 85 weight percent linear low density polyethylene and 15 weight percent titanium dioxide pigment. For film inner layer: 70 weight percent high density polyethylene, 15 weight percent low linear polyethylene and 15 weight percent titanium dioxide pigment. The extruders were respectively adjusted to feed 20 weight percent, 60 weight percent and 20 weight percent to the multilayer sheet producing die.

The product obtained is generally similar in appearance, and physical properties to the one obtained in example 1.

Example 3

The procedure as in example 1 was repeated with the following ingredients and percentages. The outer layer consists of 45 weight percent high density polyethylene, 42 weight percent Papermatch® and 13 weight percent beige pigment. The middle layer consists of 85 weight percent linear low density polyethylene and 15 weight percent particulate calcium carbonate. The inner layer consists of 80 weight percent high density polyethylene, 16 weight percent beige pigment and 4 weight percent of an anti-blocking agent. The film obtained was excellent to make boutique bags.

Example 4

The procedure as in example 1 was repeated with the following ingredients. The outer layer consists of 47 weight percent linear low density polyethylene (low slip), 44 weight percent Papermatch®, 5 weight percent white titanium dioxide pigment and 4 weight percent PPA (polymer processing aid). The middle layer consists of 61 weight percent linear low density polyethylene, 34 weight percent high density polyethylene and 5 weight percent white titanium dioxide pigment The inner layer consists of 100 weight percent linear low density polyethylene (high slip). The film obtained was excellent for producing bags for wrapping sugar.

Example 5

The procedure as in example 1 was repeated with the following ingredients. The outer layer consists of 92 weight percent linear low density polyethylene and 8 weight percent Papermatch® the middle layer consists of 56 weight percent linear low density polyethylene, 34 weight percent high density polyethylene and 10 weight percent calcium carbonate. The inner layer consists of 78.2 weight percent linear low density polyethylene, 15 weight percent low density polyethylene, 5 weight percent gray pigment and 1.8 weight percent slip/anti-blocking agent. The film obtained was excellent for producing paper like courier envelopes.

Of course, modifications are possible as will be appreciated by those skilled in the art, without departing from the scope and spirit of the invention.

We claim:

1. A sheet of plastic material which feels like and has at least some of the properties of paper, comprising a multilayer sheet having an outer layer, a middle layer and an inner layer wherein said outer layer comprises between about 15 to 35 weight percent, said middle layer comprises between about 30 to 70 weight percent, and said inner layer comprises between about 15 to 35 weight percent, all with respect to the entire weight of said multilayer sheet, said outer layer comprises between about 40 to 90 weight percent polyethylene, between about 5 and 50 weight percent of a finely granulated material adapted to give a feel of paper to said multilayer sheet, and between about 5 and 10 weight percent of a pigment, said middle layer comprises between about 60 and 95 weight percent polyethylene, between about 0 and 20 weight percent of said finely granulated material, and between about 5 and 20 weight percent of said pigment, said inner layer comprises between about 70 and 98 weight percent polyethylene, between about 0 and 10 weight percent of a filler, and between about 0 and 20 weight percent of said pigment.

2. A sheet of plastic material according to claim 1, wherein said polyethylene is selected from the group consisting of linear low density polyethylene, high density polyethylene and mixtures thereof.

3. A sheet of plastic material according to claim 1, wherein said finely granulated material comprises particulate calcium carbonate.

4. A sheet of plastic material according to claim 1, wherein said pigment comprises titanium dioxide.

5. A sheet of plastic material according to claim 1, wherein said filler is selected from the group consisting of an anti-blocking agent, silica, talc, diatomaceous earth and mixtures thereof.

6. A sheet of plastic material according to claim 2, wherein said outer layer comprises linear low density polyethylene, said middle layer comprises high density polyethylene, and said inner layer comprises linear low density polyethylene.

7. A sheet of plastic material according to claim 1, wherein said outer layer comprises between about 40 and 60 weight percent linear low density polyethylene, between about 30 and 50 weight percent of particulate calcium carbonate dispersed in a high density polyethylene base and between about 4 and 8 weight percent of a pigment comprising titanium dioxide.

8. A sheet of plastic material according to claim 7, wherein said middle layer comprises between about 75 and 85 weight percent high density polyethylene, between about 10 and 20 weight percent of said particulate calcium carbonate dispersed in a high density polyethylene base, and between about 4 and 8 weight percent titanium dioxide.

9. A sheet of plastic material according to claim 8, wherein said inner layer comprises between about 90 and 98 weight percent linear low density polyethylene and between about 2 to 10 weight percent of a filler comprising at least one of an anti-blocking agent, talc, silica and diatomaceous earth.

10. A sheet of plastic material according to claim 9, wherein said outer layer comprises about 25 weight percent, said middle layer comprises about 50 weight percent, and said inner layer comprises about 25 weight percent all with respect to the entire weight of the multilayer sheet.

11. A sheet of plastic material according to claim 10, wherein said outer layer comprises about 60 weight percent linear low density polyethylene, and about 40 weight percent particulate calcium carbonate dispersed in a high density polyethylene base, said middle layer comprises about 75 weight percent high density polyethylene, about 15 weight percent particulate calcium carbonate in a high density polyethylene base, and about 10 weight percent titanium dioxide pigment, said inner layer comprises about 96 weight percent linear low polyethylene, and about 4 weight percent of a mixture comprising an anti-blocking agent, talc, silica, and diatomaceous earth.

12. A sheet of plastic material according to claim 1, wherein said outer layer comprises between about 80 and 90 weight percent high density polyethylene, between about 5 and about 10 weight percent particulate calcium carbonate in a high density polyethylene base, and between about 5 and 10 weight percent titanium dioxide pigment.

13. A sheet of plastic material according to claim 12, wherein said middle layer comprises between about 80 and 90 weight percent linear low density polyethylene and between about 10 and 20 weight percent titanium dioxide pigment.

14. A sheet of plastic material according to claim 13, wherein said inner layer comprises between about 60 and 80 weight percent high density polyethylene, between about 10 and 20 weight percent linear low density polyethylene, and between about 10 and 20 weight percent titanium dioxide pigment.

15. A sheet of plastic material according to claim 1, which has an oxygen transmission rate between about 30 and 50 cc/100 in$^2$/24 hours, a water vapor transmission rate between about 0.01 and 0.025 g/100 in$^2$/24 hours, and a coefficient of friction between 0.4 and 0.5.

16. A sheet of plastic material according to claim 1, wherein said outer layer comprises about 20 weight percent, said middle layer comprises about 60 weight percent, and said inner layer comprises about 20 weight percent, all with respect to the entire weight of the multilayer sheet, said outer layer comprises about 85 weight percent polyethylene, about 10 weight percent of said finely granulated material, and about 5 weight percent of said pigment, said middle layer comprises about 85 percent polyethylene and about 15 weight percent of said pigment, said inner layer comprises about 70 weight percent polyethylene, about 15 weight percent linear low density polyethylene, and about 15 weight percent of said pigment.

* * * * *